United States Patent
Höhl

(10) Patent No.: US 6,931,997 B2
(45) Date of Patent: Aug. 23, 2005

(54) DRIVE UNIT FOR A MOTOR VEHICLE WITH CURVED TEETH COUPLING

(75) Inventor: Gernot Höhl, Mistelgau (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/473,695

(22) PCT Filed: Mar. 27, 2002

(86) PCT No.: PCT/DE02/01133

§ 371 (c)(1),
(2), (4) Date: Sep. 29, 2003

(87) PCT Pub. No.: WO02/081280

PCT Pub. Date: Oct. 17, 2002

(65) Prior Publication Data

US 2004/0107865 A1 Jun. 10, 2004

(30) Foreign Application Priority Data

Apr. 9, 2001 (DE) .......................... 101 17 749

(51) Int. Cl.[7] .................................. B61C 9/00
(52) U.S. Cl. ................. 105/96.1; 105/136; 105/133; 74/421 A; 403/359.1; 464/162
(58) Field of Search ............. 74/421 A; 105/96, 105/96.1, 114, 136, 133; 403/359.1, 298; 464/162, 158

(56) References Cited

U.S. PATENT DOCUMENTS

| 4,278,028 A | 7/1981 | Eichinger et al. | |
| 4,475,737 A | * 10/1984 | Cook et al. | 464/162 |
| 4,832,637 A | * 5/1989 | Goluba | 440/83 |
| 6,241,616 B1 | * 6/2001 | Lightcap | 464/162 |
| 6,582,151 B2 | * 6/2003 | Hopson | 403/359.5 |

FOREIGN PATENT DOCUMENTS

| DE | 29 25 836 | 11/1980 | |
| DE | 19505695 A1 | * 8/1996 | B61C/9/44 |
| DE | 196 00 420 | 2/1997 | |
| DE | 196 02 119 | 5/1997 | |
| DE | 196 47 063 | 5/1998 | |
| DE | 198 37 942 | 2/2000 | |
| EP | 0 132 236 | 1/1985 | |
| EP | 132236 A2 | * 1/1985 | B61C/9/48 |
| EP | 0 878 368 | 11/1998 | |
| JP | 58211020 A | * 12/1983 | F16D/1/06 |

* cited by examiner

Primary Examiner—Frantz F. Jules
(74) Attorney, Agent, or Firm—Henry M. Feiereisen

(57) ABSTRACT

Angular and axial offsets between the motor vehicle rotor (3) and transmission pinion (6) are intended to be compensated by a coupling which can be mounted in an easy manner. According to the invention, a curved teeth coupling (9) is mounted between the motor shaft (4) and the pinion shaft (6) and includes a first coupling section (10) with internal tooth system and a second coupling section (11) with external tooth system, whereby the first coupling section (10) is securely connected to the pinion shaft (6) and the second coupling section (11) is securely connected to the motor shaft (4). The coupling sections (10, 11) can easily be pushed into each other, when the motor (2) is mounted onto the transmission (1).

10 Claims, 1 Drawing Sheet

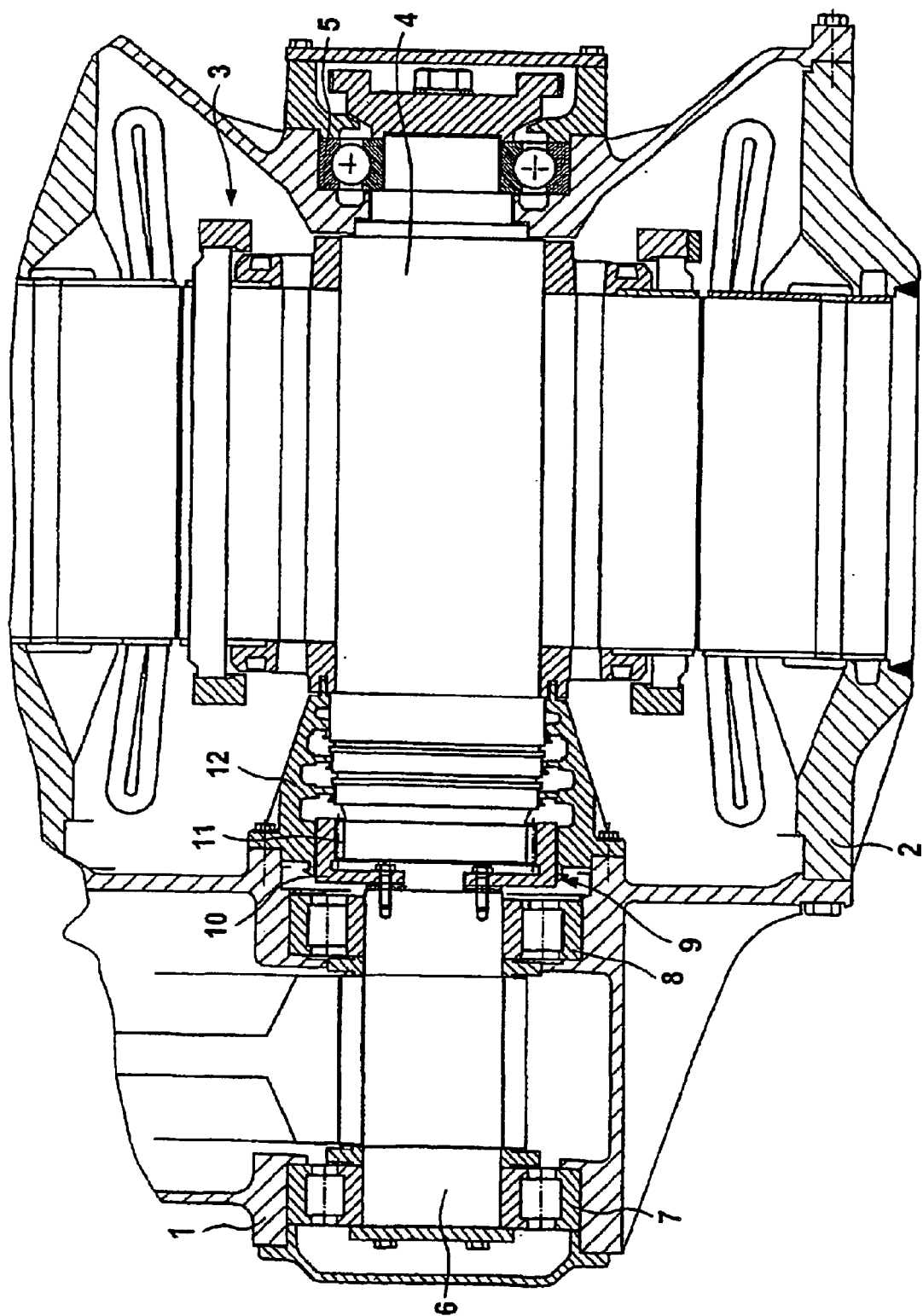

DRIVE UNIT FOR A MOTOR VEHICLE WITH CURVED TEETH COUPLING

BACKGROUND OF THE INVENTION

The present invention relates to an apparatus for driving in particular railway vehicles with a rotor device of an induction machine, a shaft, a transmission device, and a coupling device between the rotor device and the shaft.

Drives for railway vehicles normally include an electric motor and a transmission for driving an axle or a wheel of the railway vehicle. The drives are constantly exposed to high loads as a result of vibration and shock so that the support of the drives as well as the support of the single components of the drives themselves is of great importance.

In general, drives for electric motor vehicles, in particular nose-suspended drives and fully spring-suspended drives, are designed with cantilevered pinion, externally supported pinion or pinion supported on two bearings. Drives for railway vehicles, in particular nose-suspended drives, exposed to high loads due to vibration and shock are suitably configured with a transmission pinion which is supported on two bearings, as is the case in the Adtranz locomotive BR 145/185, for example. Fully spring-suspended drives, like Gealaif drives, may be equipped with this type of pinion support for maintenance reasons.

Nose-suspended drives and fully spring-suspended drives involve each a rigid connection of the transmission with the motor. Therefore, a coupling has to be provided between the rotor of the driving motor and the double supported transmission pinion. This coupling has to compensate an angular offset and an axial offset, caused by tolerances during manufacture or loads due to vibration and shock. Furthermore, a coupling is required to maintain the static definition of the triple support of the rotor of the driving motor with the transmission pinion. Hereby, diaphragm clutches or disc clutches with stack of sheets are typically used. These clutches are, however, expensive, require large installation space and, as a consequence of their elastic buckling strength, adversely affect the support. Furthermore, they have the drawback that during idling, there is no load on one bearing so that the bearing may be damaged. Moreover, such clutches can be installed only at great labor.

Patent publication DE 196 02 119 C1 describes in this context a drive which includes a spring-supported motor with internal rotor and a stator which is secured to the chassis and supported by a fixed axle via a primary spring. The rotor of the motor transmits hereby its torque via a coupling device and a transmission to the drive wheel, whereby the motor is provided on one side of the drive wheel and the transmission is provided on the other side of the drive wheel. An angularly yielding and axially yielding clutch or coupling device, in particular a curved teeth coupling with a coupling shaft, is connected to a transmission shaft for transferring a torque. Manufacture and assembly of such drives is however very complicated.

SUMMARY OF THE INVENTION

It is therefore the object of the present invention to obviate the afore-stated drawbacks and more particularly to provide a drive which can be mounted in a simple manner.

This object is attained in accordance with the invention by an apparatus for driving in particular railway vehicles with a rotor device of an induction machine, a shaft, a transmission device, and a coupling device between the rotor device and the shaft, wherein the coupling device is a curved teeth coupling with a first coupling section with internal tooth system and a second coupling section with external tooth system, and wherein the first coupling section is securely connected with the shaft, and the second coupling section is securely connected with the rotor device, or vice versa.

Advantageous further developments of the invention are set forth in the sub-claims.

Advantageously, a coupling is thus realized which is very compact and can be lubricated by the transmission oil. Moreover, through use of the curved teeth coupling, it becomes possible to eliminate one or, upon suitable construction, even two shaft/hub connections, e.g. radial tooth systems or press fits, as the coupling can be integrated, e.g. equally, into the rotor shaft and/or pinion shaft. Furthermore, the assembly is simplified compared to known drives as both coupling halves can be simply plugged axially into one another.

The curved teeth coupling exposes the support to no or only very small forces during torque load so that the afore-stated problem especially with regard to the diaphragm coupling is eliminated. The support is thus fully statically defined.

BRIEF DESCRIPTION OF THE DRAWING

The present invention will now be described in more detail with reference to the attached drawing which shows a cross section through a drive according to the invention.

DETAILED DESCRIPTION OF PREFERRED EMBODIMENTS

The exemplified embodiment described hereinafter represents only a preferred embodiment of the present invention.

According to the drawing, a transmission casing 1 is securely screwed onto a motor casing 2. A rotor 3 embraces the motor shaft 4 which is supported on one end in a fixed bearing 5.

A pinion or a pinion shaft 6 is supported in the transmission casing 1 by two bearings 7 and 8.

Ideally, the motor shaft 4 and the pinion have a common rotation axis. Due to manufacturing tolerances of the casings 1, 2, bearings 7, 8 as well as motor shaft 4 and pinion, it is necessary to provide a curved teeth coupling 9 between the motor shaft 4 and the pinion. As already mentioned, this coupling is also required to prevent a direct transfer of vibrations and shocks from the pinion to the rotor 3.

The curved teeth coupling includes a first coupling section 10 with internal tooth system. This cup-shaped first coupling section 10 is screwed in coaxial relationship to the pinion or pinion shaft 6. The first coupling section 10 may, of course, also be connected with the pinion in any other manner. Furthermore, the first coupling section 10 may be configured in one piece with the pinion.

A second coupling section 11 with external tooth system engages in the first coupling section 10 with internal tooth system for torque transfer. The second coupling section 11 is connected in one piece with the motor shaft 4. It may, of course, also be a separate component that is connected, e.g. screwed, to the motor shaft 4 in coaxial relationship.

As can be seen directly from the drawing, both coupling sections 10 and 11 may be directly pushed within one another, when the transmission 1 is mounted to the motor 2. The assembly is thus minimal.

As the curved teeth coupling 9 compensates angular and axial offsets of the pinion and the motor shaft 4, provision should be made for a sufficient lubrication. Lubrication of the curved teeth coupling 9 may be realized by the oil that is already present in the transmission 1 and can also be used for lubrication of the coupling-side bearing of the pinion shaft 6. As is the case in other coupling variations, also the curved teeth coupling requires the provision of a seal 12 toward the motor.

The curved teeth coupling 9 may, of course, also be so configured that a first coupling section with internal tooth system is securely connected or in single piece construction with the motor shaft 4 and a second coupling section with external tooth system is securely connected or in single piece construction with the pinion shaft 6. In particular, it is also conceivable to configure the motor shaft or pinion shaft 4, 6, depending on the configuration, as hollow shaft with internal tooth system in which the respectively other shaft with externally toothed coupling section engages.

By coupling the motor shaft 4 with the pinion shaft 6 through the curved teeth coupling 9 in accordance with the invention, it is thus ensured that angular and axial offsets are compensated at minimum manufacturing and assembly expenditure. This is especially assured by the fact that both coupling sections 10 and 11 are securely connected with both shafts 4 and 6 and can be easily pushed into one another during assembly.

What is claimed is:

1. Apparatus for driving railway vehicles with a rotor device (3, 4) of an induction machine having a solid motor shaft (4), a transmission shaft (6), a transmission device, and a coupling device (9) between the rotor device (3, 4) and the transmission shaft (6), characterized in that the coupling device (9) is a curved teeth coupling with a first coupling section (10) with internal tooth system and a second coupling section (11) with external tooth system, and wherein the first coupling section (10) is securely connected with the shaft (6), and the second coupling section (11) is securely connected with the motor shaft (4), or the first coupling section (10) is securely connected with the motor shaft (4), and the second coupling section (11) is securely connected with the transmission shaft (6), and wherein the rotor device (3, 4) is supported only on the coupling-distal side in a bearing (5).

2. Apparatus according to claim 1, wherein the transmission shaft (6) is a double supported pinion shaft.

3. Apparatus according to claim 1, wherein the first or the second coupling section (10, 11) of the curved teeth coupling (9) is connected in single-piece configuration with the rotor device (3, 4) or the transmission shaft (6).

4. Apparatus according to claim 1, wherein the first or the second coupling sections (10, 11) of the curved teeth coupling (9) is connected with the transmission shaft (6) or the rotor device (3, 4) by a screw connection with radial tooth system.

5. Apparatus according to claim 1, wherein lubrication of the coupling device is implemented by the oil of the transmission device.

6. Apparatus for driving a vehicle, comprising:
   an induction machine having a solid motor shaft and a rotor in surrounding relationship to the motor shaft;
   a transmission operatively connected to the induction machine and including a transmission shaft;
   a curved teeth coupling having a first coupling section with internal tooth system and a second coupling section with external tooth system, wherein one member selected from the first group consisting of the first coupling section and the second coupling section is securely connected with one member selected from the second group consisting of the transmission shaft and the motor shaft, and the other member of the first group is securely connected to the other member of the second group; and
   a first bearing unit, said induction machine being supported only on a side distal to the curved teeth coupling by the first bearing unit.

7. The apparatus of claim 6, wherein the transmission shaft is a pinion shaft, and further comprising a second bearing unit having two bearings in spaced-apart relationship for supporting the pinion shaft.

8. The apparatus of claim 6, wherein at least one member of the first group is connected in single-piece configuration with a member of the second group.

9. The apparatus of claim 6, wherein at least one member of the first group is connected to a member of the second group by a screw connection with radial tooth system.

10. The apparatus of claim 6, wherein the transmission includes oil as lubricant which is used to lubricate the curved teeth coupling.

* * * * *